(12) United States Patent
Shikano et al.

(10) Patent No.: US 7,960,022 B2
(45) Date of Patent: Jun. 14, 2011

(54) FORGERY-PREVENTING FILM

(75) Inventors: Tamio Shikano, Kashima-gun (JP);
Takaaki Asakura, Kashima-gun (JP);
Takahiko Ueda, Kashima-gun (JP)

(73) Assignee: Yupo Corporation, Tokyo (JP)

( * ) Notice: Subject to any disclaimer, the term of this patent is extended or adjusted under 35 U.S.C. 154(b) by 74 days.

(21) Appl. No.: 12/266,683

(22) Filed: Nov. 7, 2008

(65) Prior Publication Data

US 2009/0176075 A1 Jul. 9, 2009

Related U.S. Application Data

(60) Division of application No. 10/390,013, filed on Mar. 18, 2003, now abandoned, which is a continuation of application No. PCT/JP01/08101, filed on Sep. 18, 2001.

(30) Foreign Application Priority Data

| Sep. 18, 2000 | (JP) | 2000-281933 |
| Sep. 18, 2000 | (JP) | 2000-281934 |
| Sep. 18, 2000 | (JP) | 2000-281935 |
| Nov. 2, 2000 | (JP) | 2000-336161 |
| Nov. 2, 2000 | (JP) | 2000-336162 |

(51) Int. Cl.
*B32B 7/12* (2006.01)
*B32B 3/10* (2006.01)
*B32B 3/00* (2006.01)
*B32B 27/08* (2006.01)
*G11B 5/64* (2006.01)

(52) U.S. Cl. ........ 428/343; 428/138; 428/141; 428/156; 428/516; 428/910; 428/916

(58) Field of Classification Search .................. 428/343, 428/138, 141, 156, 516, 910, 916
See application file for complete search history.

(56) References Cited

U.S. PATENT DOCUMENTS

| 3,769,380 A | * 10/1973 | Wiley ........................ 264/40.6 |
| 4,381,329 A | 4/1983 | Dallmann et al. |
| 5,871,833 A | 2/1999 | Henbo et al. |
| 6,045,894 A | 4/2000 | Jonza et al. |

FOREIGN PATENT DOCUMENTS

| CN | 2222055 Y | 3/1996 |
| JP | 56-19273 | 5/1981 |
| JP | 57-047655 | 3/1982 |
| JP | 58-168457 | 11/1983 |
| JP | 59-64271 | 4/1984 |
| JP | 60-79992 | 5/1985 |
| JP | 62-130874 | 6/1987 |
| JP | 62-279992 | 12/1987 |
| JP | 01-229698 | 9/1989 |
| JP | 2-51742 | 11/1990 |
| JP | 4-18078 | 3/1992 |
| JP | 05094615 | 4/1993 |
| JP | 5-177919 | 7/1993 |
| JP | 07-068980 | 3/1995 |
| JP | 10-086562 | 4/1998 |
| JP | 11-157016 | 6/1999 |
| JP | H11-508498 A | 7/1999 |
| WO | WO 97/001438 A1 | 1/1997 |

OTHER PUBLICATIONS

Japanese Office Action for Japanese Patent Application No. 2001-283040, dated Oct. 19, 2010, with English translation.

* cited by examiner

*Primary Examiner* — Victor S Chang
(74) *Attorney, Agent, or Firm* — Oblon, Spivak, McClelland, Maier & Neustadt, L.L.P.

(57) ABSTRACT

Disclosed is a forgery-preventing film having, on one side of a first layer (A) comprising a thermoplastic resin, a second layer (B) comprising a thermoplastic resin wherein said film satisfying at least one of the following conditions: Condition 1: one side of said first layer (A) is treated to prevent forgery and said second layer (B) is formed on the surface of the treated side of said first layer (A); Condition 2: said second layer (B) comprises at least two thermoplastic resins of different melt viscosities; Condition 3: porosity of said second layer (B) is greater than porosity of said first layer (A); and Condition 4: a polymer net is formed on one side of said first layer (A) and said second layer (B) is formed on the surface having the polymer net.

19 Claims, No Drawings

FORGERY-PREVENTING FILM

TECHNICAL FIELD

The present invention relates to a forgery-preventing film for use on bank notes, bills, checks, traveler's checks, securities, cards and the like, which need to prevent forgery and falsification.

BACKGROUND ART

In modern society, numerous documents and cards with forgery and duplication being prohibited are in circulation, such as bank notes, checks, securities, and cards. The forgery and duplication of these items must not only be prohibited by law, but must also be rendered technically impossible to maintain social order. However, copying and duplication technologies have made alarming strides in recent years, with the risk of forgery and duplication increasing each year. The crime of forgery has been increasing of late, and the techniques employed are becoming ever more sophisticated.

Accordingly, various techniques of preventing forgery and duplication have been developed.

For example, there are techniques of visually detecting forgery based on external appearance. Specifically, there are techniques of incorporating fluorescent substances in printed matter; a technique of printing with magnetic ink to permit visual detection of the change in density of the ink by magnetic effects (Japanese Unexamined Patent Publication (KOKAI) Heisei No. 5-177919); the technique of printing with ink comprising photochromic light-sensitive pigments (Japanese Unexamined Patent Publication (KOKAI) Showa No. 60-79992); techniques of printing with ink having specific reflection spectroscopic characteristics or two or more inks having differences in reflectance exceeding a prescribed value; printed matter exhibiting change in color when viewed from a certain angle (Japanese Unexamined Patent Publication (KOKAI) Heisei No. 5-177919); printed matter imparted with a watermark (latent image) (Japanese Examined Patent Publication (KOKOKU) Heisei No. 4-18078, Japanese Unexamined Utility Model Publication (JIKKAI) No. Showa 58-168457); and the like.

Further, printed matter that has been finely processed to render reading of the text and images on a copied paper difficult, and warning marks that appear on a copied paper have been developed (Japanese Unexamined Utility Model Publication (JIKKAI) No. Showa 59-64271).

There are also materials that are printed with special magnetic ink so that an error occurs when a copy is placed on a discriminating device; printed materials that are printed so that the density of printed halftones on copies differs from that of the original (authentic note) (Japanese Examined Patent Publication (KOKOKU) Showa No. 56-19273 and Heisei No. 2-51742); and materials on which are printed characters that cannot be discerned by the naked eye but on which hidden characters can be read with a discriminating device (Japanese Unexamined Patent Publication (KOKAI) Showa No. 62-130874).

Although such a variety of forgery-preventing strategies has been developed, most of the originals can be duplicated by graphic platemaking, and these forgery-preventing strategies cannot be considered complete. Further, many items such as authentic notes develop wrinkles during use, and are then rejected by the discriminating device as "Unusable".

In consideration of these problems of prior art, the present invention has for its object to provide a forgery-preventing film that can be readily distinguished from copies, tends not to wrinkle, and affords good print adhesion.

DISCLOSURE OF THE INVENTION

The present inventors conducted extensive research, resulting in the discovery that the above-stated object can be achieved by the forgery-preventing film of the present invention which has, on one side of a first layer (A) comprising a thermoplastic resin, a second layer (B) comprising a thermoplastic resin, and satisfies at least one of Conditions 1 to 4:

Condition 1: one side of first layer (A) is treated to prevent forgery and second layer (B) is formed on the surface of the treated side of first layer (A);

Condition 2: second layer (B) comprises at least two thermoplastic resins of different melt viscosities;

Condition 3: porosity of second layer (B) is greater than porosity of first layer (A); and Condition 4: a polymer net is formed on one side of first layer (A) and second layer (B) is formed on the surface having the polymer net.

In the forgery-preventing film of the present invention, a third layer (C) is desirably formed on the back side of first layer (A), and first layer (A) is desirably of a multilayer structure.

In the forgery-preventing film of the present invention satisfying Condition 1, both sides of first layer (A) are desirably treated to prevent forgery, with second layer (B) and third layer (C) being formed on the treated surfaces of the first layer (A). It is further desirable that the treatment to prevent forgery is embossing or printing. The opacity of the film used to prevent forgery can be adjusted to from 1 to 60 percent. Additionally, the porosity of first layer (A) can be made from 0 to 40 percent and the porosity of second layer (B) can be made from greater than 20 percent to less than or equal to 40 percent (referred to hereinafter as Condition 5). In the film for preventing forgery of the present invention satisfying Condition 5, a third layer (C), having a porosity of greater than 20 percent and less than or equal to 40 percent, is desirably formed on the back side of first layer (A). The opacity is desirably greater than 60 percent and less than or equal to 99 percent.

In the forgery-preventing film of the present invention satisfying Condition 2, the difference in melt viscosity of two thermoplastic resins having different melt viscosities contained in second layer (B) is desirably greater than 50 Pa·s. A third layer (C) comprising at least two thermoplastic resins having different melt viscosities is desirably formed on the back side of first layer (A). Further, the difference in the melt viscosity of the at least two thermoplastic resins of different melt viscosities contained in third layer (C) is desirably greater than 50 Pa·s. Further, the opacity of the forgery-preventing film is desirably from 1 to 60 percent.

In the forgery-preventing film of the present invention satisfying Condition 3, the ratio (A/B) of the porosity of first layer (A) to that of second layer (B) is desirably less than or equal to ⅓. Each of first layer (A) and second layer (B) desirably comprises an inorganic finepowder and/or an organic filler, with an average particle diameter of the inorganic finepowder and/or the organic filler contained in second layer (B) being desirably greater than the average particle diameter of the inorganic finepowder and/or the organic filler contained in first layer (A). Further, a third layer (C) comprising a thermoplastic resin is desirably formed on the back side of first layer (A), with the porosity of third layer (C) desirably being greater than that of first layer (A). The ratio (A/C) of the porosity of first layer (A) to that of third layer (C) is desirably less than or equal to ⅓. In particular, both first layer (A) and third layer (C) desirably comprise an inorganic finepowder and/or an organic filler, with the average particle diameter of the inorganic finepowder and/or the organic filler contained in first layer (C) desirably being greater than the average particle diameter of the inorganic finepowder and/or the organic filler contained in third layer (A). Further, the opacity of the forgery-preventing film is desirably from 10 to 60 percent.

The forgery-preventing film of the present invention satisfying Condition 4 is desirably treated to prevent forgery with a polymer net. Further, the forgery-preventing film is desirably stretched in at least one direction, with the polymer net being desirably comprised of a thermoplastic resin and having a network structure in the form of a grid. In particular, the structural component (T) in the traverse direction of the polymer net is desirably an unstretched thermoplastic resin tape. Further, an average traverse and longitudinal tear strength as described in JIS K7128 is desirably greater than or equal to 20 gf. Still further, a third layer (C) is desirably formed on the back side of first layer (A). In particular, first layer (A) is desirably treated to prevent forgery on both surfaces, with second layer (B) and third layer (C) being desirably formed on each of the treated sides of first layer (A). Further, the opacity of second layer (B) and third layer (C) is desirably from 1 to 99 percent.

BEST MODE FOR CARRYING OUT THE INVENTION

The forgery-preventing film of the present invention is described in detail below with reference to suitable implementation modes.

The forgery-preventing film of the present invention has a structure in which a second layer (B) is formed on one side of first layer (A). Further, a third layer (C) is desirably present on the opposite side of first layer (A). The individual layers constituting the forgery-preventing film of the present invention will be described in order, along with their methods of manufacture and application.

First Layer (A)

First layer (A) constituting the forgery-preventing film of the present invention, comprises at least a thermoplastic resin.

Examples of the thermoplastic resin employed in first layer (A) are: high-density polyethylene, medium-density polyethylene, low-density polyethylene, and other ethylene based resins; propylene based resins, polymethyl-1-pentene, ethylene-cyclic olefin copolymers, styrene grafted polyolefin resins, and other polyolefin resins; nylon 6, nylon 6,6, nylon 6,10, nylon 6,12, and other polyamide resins; polyethylene terephthalate and copolymers thereof; polyethylene naphthalate, aliphatic polyester and other thermoplastic polyester resins; and polycarbonates, atactic polystyrene, syndiotactic polystyrene, polyphenylenesulfide, and other thermoplastic resins. Two or more of these compounds may be combined for use. Of these, the use of polyolefin resins is preferred. Among the polyolefin resins, from the perspectives of cost, water resistance, and chemical resistance, the use of propylene based resin and high-density polyethylene is preferred.

The propylene based resin employed is desirably a propylene homopolymer (polypropylene) exhibiting isotactic, syndiotactic or some degree of stereoregularity, metallocene propylene, or copolymer comprising a principal component in the form of propylene with ethylene, 1-butene, 1-hexene, 1-heptene, 4-methyl-1-pentene, or some other α-olefin. These copolymers may be two-component, three-component, or four-component systems, as well as random copolymers or block copolymers.

In addition to a thermoplastic resin, first layer (A) also desirably comprises an inorganic finepowder and/or an organic filler.

An inorganic finepowder with an average particle diameter of from 0.01 to 15 micrometers, preferably from 0.01 to 8 micrometers, and more preferably, from 0.03 to 4 micrometers may be employed. Specifically, calcium carbonate, calcined clay, silica, diatomaceous earth, talc, titanium dioxide, barium sulfate, alumina, or the like may be employed.

An organic filler with an average particle diameter following dispersion of from 0.01 to 15 micrometers, preferably from 0.01 to 8 micrometers, and more preferably from 0.03 to 4 micrometers may be employed. A resin differing from the thermoplastic resin that is the principal component is desirably selected as the organic filler. For example, when the thermoplastic resin is a polyolefin resin, the organic resin for the organic filler is desirably polyethylene terephthalate, polybutylene terephthalate, polycarbonate, nylon 6, nylon 6,6, cyclic olefin homopolymer, or the copolymer of a cyclic olefin and ethylene, having a melting point of from 120 to 300° C. or a glass transition temperature of from 120 to 280° C.

As needed, stabilizers, photostabilizers, dispersing agents, lubricants, fluorescent whitening agents, colorants, and the like may also be blended into first layer (A).

For example, 0.001 to 1 weight percent of a steric hindered phenol-based, phosphorus-based, or amine-based stabilizer may be blended in as the stabilizer. For example, 0.001 to 1 weight percent of a steric hindrance amine, benzotriazole-based, benzophenone-based, or other photostabilizer may be blended in as the photostabilizer. For example, 0.01 to 4 weight percent of a silane coupling agent, a higher aliphatic acid such as oleic acid or stearic acid, a metal soap, polyacrylic acid, polymethacrylic acid, or salts thereof may be blended in as the dispersing agent of the inorganic finepowder. For example, 0.001 to 1 weight percent of imidazole, imidazolone, triazole, thiazole, oxazole, oxadiazole, cumarin, carbostyryl, thiadiazole, napthylimido, or pyrazolone may be blended in as the fluorescent whitening agent; specific examples are 2,5-bis[5-t-butylbenzooxazolyl(2)] thiophene, dicyclohexyl phthalate, 4-methoxynaphthalic acid-N-methylimide, diaminostylbenedisulfonic acid derivatives, and diaminostylbene derivatives. Pellets that have been colored with various pigments may be blended in a proportion of 5 to 30 weight percent as coloring agents.

First layer (A) of the forgery-preventing film of the present invention may have a single-layer structure or a multilayer structure of two layers or more. First layer (A) or a portion of a layer comprising first layer (A) is desirably stretched in at least one direction.

When first layer (A) is comprised of a three-layer structure (A1/A2/A3) of layer (A1), layer (A2), and layer (A3), the thickness of (A1+A3) is desirably greater than or equal to 1 micrometer, and the ratio of the thickness of (A1+A3) to A2 is desirably from 1:40 to 1:10. The thickness of first layer (A) is desirably from 25 to 100 micrometers, preferably from 30 to 75 micrometers, and more preferably from 40 to 60 micrometers.

In the forgery-preventing film of the present invention that satisfies Condition 1, one or both sides of first layer (A) is treated to prevent forgery. The treatment to prevent forgery may be a direct treatment of the surface of first layer (A), or a layer that has been treated to prevent forgery may be formed over first layer (A). The embossing or printing of the surface of first layer (A) is preferred.

As examples of methods of embossing, various known presses and embossers such as planographic presses and roll embossers may be used to raise in relief the design of an embossing plate by means of heat and pressure. In the roll embossing method, the relief design of an embossing drum is imparted by heat and pressure to the material being embossed. As a specific example, first layer (A) is extruded in hot melt form as a film from a single-layer or multilayer T-die or I-die connected to an extruder and then cooled by cooling rolls to obtain a film. In the course of this process, the film surface is pressed with embossing rolls to impart a shape and cooled to fix the shape.

Portions of the film that contact raised areas of the embossing rolls during this process are whitened during stretching. Further, the film is misted by blowing water in mist form to rapidly cool portions of the film with water droplets and cause them to turn white. Following cooling of first layer (A), a shape may also be stamped with hot rolls.

Various printing methods, such as hot melt transfer, electrophotography, ink-jet, and laser marker, may be employed in the treatment to prevent forgery. In particular, when printing a wax-type or resin-type ink used in the hot melt transfer method, the image is first transferred to a film with weak ink adhesion, a heating roll or the like is employed from the back of the print surface of this film to bring about hot pressure adhesion to the unstretched film, thereby transferring the image. Accordingly, with this method, it is possible not to provide a printing device in the molding line.

Treatment to prevent forgery by printing is desirably conducted while first layer (A) is in an unstretched state prior to stretching. When first layer (A) is being uniaxially stretched, printing is conducted before longitudinal stretching, and when it is being biaxially stretched, printing is conducted before longitudinal or traverse stretching.

In one form of treatment to prevent forgery of Condition 1, a layer that has been treated to prevent forgery is sandwiched between first layer (A) and second layer (B), and/or between first layer (A) and third layer (C). The layer that has been treated to prevent forgery may be a printed layer, for example. For example, the layer that has been treated to prevent forgery may be deposited following stretching of first layer (A) and then sandwiched in by forming second layer (B) or third layer (C) thereover. When preparing a forgery-preventing film comprising, for example, a uniaxially stretched second layer (B), a biaxially stretched first layer (A), and a uniaxially stretched third layer (C), following the longitudinal stretching of layer (A) and immediately before the hot melt lamination of layer (B), a preprinted film (D) may be inserted to obtain a forgery-preventing film in the form of a (B)/(D)/(A)/(D)/(B) or (B)/(D)/(A)/(B) laminate.

Printed film (D) may be an unstretched film, a uniaxially stretched film, a biaxially stretched film, or a laminate thereof, but a uniaxially stretched film is preferred from the perspective of preventing increased traverse stretching stress in subsequent processing. Methods of printing include electrophotographic methods, hot melt transfer, and rewritable marking. An ink-jet printer may be employed, as may letterpress printing, gravure printing, flexo printing, solvent offset printing, ultraviolet-setting offset printing, offset printing, screen printing and various other forms of printing. The printed image is desirably reduced in size by 1/(stretching ratio) in consideration of the subsequent stretching ratio.

Hot marking the forgery-preventing film satisfying Condition 1 is also possible to prevent forgery. When the opacity of the forgery-preventing film is made a low 1 to 60 percent, the opacity of portions that have been hot marked decreases, rendering them semitransparent or transparent. Portions that are not pressed during hot marking retain their original semitransparency so that when exposed to sunlight or a light source such as a fluorescent lamp, a sharp mark is obtained and forgeries can be detected at a glance. However, unclear marks are obtained in fully transparent films, and it tends to be difficult to detect forgeries at a glance. Further, when a large quantity of inorganic finepowder and/or organic filler is incorporated, when mark pressing is conducted at ordinary temperature, in contrast to hot marking, voids within the film are crushed and the crushed areas become opaque, with areas outside the pressed areas remaining semitransparent. It is thus possible to obtain a sharp mark permitting the detection of forgeries at a glance.

When the opacity of the forgery-preventing film is greater than 60 percent and less than or equal to 99 percent, such as when Condition 5 is satisfied, the pressed portions become less opaque during hot marking, becoming semitransparent or transparent. Portions that are not pressed during hot marking retain their original opacity, so that when exposed to sunlight or a light source such as a fluorescent lamp, a sharp mark can be recognized, permitting the detection of forgeries at a glance. However, the marks become unclear in completely transparent films, and it tends to be difficult to detect forgeries at a glance.

The marking step with heating or at ordinary temperature not only has the effect of preventing forgery, but also effectively permits persons with impaired vision to readily determine the denomination of a bill or the like by feeling it with the finger tips.

Polymer Net

In the forgery-preventing film of the present invention satisfying Condition 4, a polymer net is laminated on one side of first layer (A), and second layer (B) is laminated over the surface on which the polymer net has been laminated.

The method of treating the polymer net to prevent forgery is not specifically limited. For example, a printed layer may be provided on a thermoplastic resin film, a fluorescent whitening agent or a fluorescent pigment may be kneaded in, or two or more of such methods may be employed in combination. When printing is employed, for example, a trademark, code, mark, patent number, publisher, producer, material name, product number, product specification number, lot number, bar code, or the like may be printed. The size of the print is desirably smaller than the width of the thermoplastic resin tape constituting the polymer net and large enough to permit reading without missing print in the case of a polymer net. Specifically, the print desirably falls within a range of from 0.5 to 2 mm.

Methods of printing include electrophotographic methods, hot melt transfer, rewritable marking, and ink-jet printer. Letterpress printing, gravure printing, flexo printing, solvent offset printing, ultraviolet-setting offset printing, offset printing, screen printing and various other forms of printing may be employed. The printed image is desirably reduced in size by 1/(stretching ratio) in consideration of the subsequent stretching ratio.

The ink employed in printing of the printed layer is not specifically limited. Common commercially employed inks may be employed. To better prevent forgery, fluorescent ink, phosphorescent ink, metallic ink, photochromic ink, thermochromic ink, holographic ink, bubble ink, and other special inks are desirably employed. A thermosetting, e-beam setting, or ultraviolet setting resin is desirably employed as the binder.

The thermosetting resin film having a printed layer may be cut using a known microslitter or tape slitter to obtain a thermoplastic resin tape for use in the polymer net. Cutting is desirably conducted in unprinted portions. The width of the thermoplastic resin tape is not specifically limited, but is normally about 1 to 5 mm.

There are no restrictions in the running direction or traverse direction of the thermoplastic resin tape. Woven cloth may be obtained by a known weaving machine manufacturing method or by hot melt bonding strands of tape together into a grid. The method of weaving when employing a weaving machine is not specifically limited; plain weaving and twill weaving are both acceptable.

On the forgery-preventing film satisfying Condition 4, it is also possible to conduct hot marking to prevent forgery. When the opacity of the forgery-preventing film of the present invention is made high, at greater than 60 percent and less than or equal to 99 percent, the opacity of areas that are pressed during processing decreases during hot melt marking, becoming semitransparent or transparent. Areas that are not pressed during hot melt marking retain their original opacity, so that when exposed to sunlight or a light source such as a fluorescent lamp, the mark can be clearly discerned and forgeries can be detected at a glance. However, in totally transparent films, the marks become unclear, tending to make it difficult to determine forgeries at a glance.

This hot marking affords not only the above-described forgery-preventing effect, but also effectively permits persons with impaired vision to readily determine the denomination of a bill or the like by feeling it with the finger tips.

One of the above-described forgery-preventing treatment methods may be selected, or two or more may be selected for use in combination in the forgery-preventing film of the present invention. When one method is selected, a good forgery-preventing effect can be imparted relatively inexpensively. When two or more methods are selected for use in combination, more effective forgery prevention can be achieved.

Second Layer (B) and Third Layer (C)

A second layer (B) is formed on one side of first layer (A) constituting the forgery-preventing film of the present invention. A third layer (C) is also formed, desirably on the opposite side of first layer (A).

Second layer (B) and third layer (C) both contain thermoplastic resins. Second layer (B) and third layer (C) also desirably contain an inorganic finepowder and/or organic filler. The thermoplastic resin, inorganic finepowder, and organic filler employed in second layer (B) and third layer (C) may be identical to those employed in first layer (A).

As needed, stabilizers, photostabilizers, dispersing agents, lubricants, fluorescent whitening agents, colorants, and the like may also be blended into second layer (B) and third layer (C).

Second layer (B) and third layer (C) may each have a single-layer structure or a multilayer structure of two or more layers. One or more of the layers comprising second layer (B) and third layer (C) is desirably stretched in at least one axial direction. The thickness of second layer (B) and third layer (C) is desirably from 5 to 50 micrometers, preferably from 10 to 40 micrometers each. However, when Condition 5 is satisfied, the thickness of second layer (B) and third layer (C) is desirably 10 to 50 micrometers, preferably 15 to 40 micrometers each.

In the forgery-preventing film of the present invention, the structure is desirably one where second layer (B) and third layer (C) are formed on either side of first layer (A). A forgery-preventing film in which first layer (A) comprises 40 to 99.5 weight percent of polyolefin resin and 60 to 0.5 weight percent of an inorganic finepowder and/or organic filler, and second layer (B) and third layer (C) comprise from 25 to 100 weight percent polyolefin resin and from 75 to 0 weight percent inorganic finepowder and/or organic filler is particularly desirable. A forgery-preventing film in which first layer (A) comprises from 50 to 97 weight percent polyolefin resin and from 50 to 3 weight percent inorganic finepowder and/or organic filler, and second layer (B) and third layer (C) comprise from 30 to 97 weight percent polyolefin resin and from 70 to 3 weight percent inorganic finepowder is further desirable. However, when the forgery-preventing film of the present invention satisfies Condition 5, a forgery-preventing film in which first layer (A) comprises from 40 to 99.5 weight percent polyolefin resin and from 60 to 0.5 weight percent inorganic finepowder and/or organic filler, and second layer (B) and third layer (C) comprise from 25 to 85 weight percent polyolefin resin and from 75 to 15 weight percent inorganic finepowder and/or organic filler is desirable. Further, a forgery-preventing film in which first layer (A) comprises from 50 to 97 weight percent polyolefin resin and from 50 to 3 weight percent inorganic finepowder and/or organic filler, and second film (B) and third film (C) comprise from 30 to 80 weight percent polyolefin resin and from 70 to 20 weight percent inorganic finepowder is preferred.

When the quantity of inorganic finepowder and/or organic filler contained in first layer (A) exceeds 60 weight percent, the stretched resin film tends to rupture during traverse stretching following longitudinal stretching. When the quantity of inorganic finepowder and/or organic filler in second layer (B) and third layer (C) exceeds 75 weight percent, the surface strength of second layer (B) and third layer (C) following traverse stretching weakens, and second layer (B) and third layer (C) tend to be damaged by mechanical impact during use.

Other layers may be provided between first layer (A) and second layer (B) comprising the forgery-preventing film of the present invention, between first layer (A) and third layer (C), on second layer (B), and on third layer (C).

In the forgery-preventing film of the present invention satisfying Condition 2, second layer (B) comprises at least two thermoplastic resins of differing hot melt viscosity. In the present Specification, the term "hot melt viscosity" refers to the hot melt viscosity at 230° C. at a shear rate of $1,220\ \text{s}^{-1}$. Here, the difference in hot melt viscosity of the two thermoplastic resins of differing holt melt viscosity contained in second layer (B) is desirably greater than 50 Pa·s, preferably greater than or equal to 70 Pa·s, and more preferably, greater than or equal to 80 Pa·s. Third layer (C) also similarly contains at least two thermoplastic resins of differing hot melt viscosity, with the difference in hot melt viscosity of the two thermoplastic resins of differing holt melt viscosity being desirably greater than 50 Pa·s, preferably greater than or equal to 70 Pa·s, and more preferably, greater than or equal to 80 Pa·s. Making the difference in hot melt viscosity greater than 50 Pa·s permits the adequate formation of streaks in the flow generated during extrusion film molding. These streaks can be used to effectively prevent forgery.

The combination of thermoplastic resins of differing hot melt viscosity is not specifically limited. The thermoplastic resins employed in above-described first layer (A) may be suitably combined for use. Specifically, the use of a combination of a propylene homopolymer and an ethylene based resin, or a propylene homopolymer and a styrene graft polyolefin resin is preferred. The thermoplastic resin of higher hot melt viscosity desirably has a hot melt viscosity of from 180 to 300 Pa·s, with from 200 to 280 Pa·s being preferred. The thermoplastic resin of lower hot melt viscosity desirably has a hot melt viscosity of from 50 to 130 Pa·s, with from 60 to 120 Pa·s being preferred.

When manufacturing the forgery-preventing film of the present invention satisfying Condition 3, the average particle diameter of the inorganic finepowder employed in second layer (B) and third layer (C) is normally from 2 to 30 micrometers, preferably from 3 to 20 micrometers, and more preferably from 3 to 15 micrometers. The average particle diameter following dispersion of the organic filler employed in second layer (B) and third layer (C) is normally from 2 to 30 micrometers, preferably from 3 to 20 micrometers, and more preferably from 3 to 15 micrometers. And the average particle diameter of the inorganic finepowder and/or organic filler employed in second layer (B) and third layer (C) is desirably greater than the average particle diameter of the inorganic finepowder and/or organic filler employed in first layer (A).

Manufacturing and Processing of the Forgery-Preventing Film

The forgery-preventing film of the present invention can be manufactured by combining various methods known to those skilled in the art. A forgery-preventing film manufactured by whatever method only falls within the scope of the present invention if it satisfies the conditions stated in the claims below.

An example of a conventional method is to conduct stretching after the formation of the layers constituting the forgery-preventing film.

The forming method is not specifically limited; any known method may be employed. Specifically, a single-layer or multilayer T-die or I-die connected to a screw extruder may be employed to extrude the hot melt resin into film form by cast molding, calender molding, rolling, inflation molding, cast molding or calendering of a mixture of thermoplastic resin and organic solvent or oil followed by removal of the solvent or oil, molding from a solution of thermoplastic resin, molding by solvent removal, or the like.

The stretching method is not also specifically limited; any of various known methods may be employed. Specific examples of stretching methods are: stretching between rolls exploiting the difference in peripheral speed of a group of rolls and clip stretching exploiting a tenter oven. More specifically, longitudinal stretching exploiting the difference in peripheral speed of a group of rolls, traverse stretching employing a tenter oven, rolling, and simultaneous biaxial stretching by a combination of a tenter oven and a linear motor may be employed. The stretching of each layer may be uniaxial, biaxial, or greater. For example, when manufacturing a film comprised of a three-layer structure consisting of second layer (B)/first layer (A)/third layer (C), the degrees of stretching of each layer may be any combination, such as uniaxial/biaxial/uniaxial, uniaxial/uniaxial/uniaxial, or biaxial/biaxial/biaxial.

The stretching ratio is not specifically limited, and may be suitably selected based on the objective and the characteristics of the thermoplastic resin employed. For example, when employing a propylene homopolymer or a copolymer thereof as the thermoplastic resin, during uniaxial stretching, a ratio of about 1.2 to 12-fold is desirable, with 2 to 10-fold preferred. During biaxial stretching, an area ratio of from 1.5 to 60-fold is desirable, with from 10 to 50-fold being preferred. When employing other thermoplastic resins, during uniaxial stretching, a ratio of from 1.2 to 10-fold is desirable, with from 2 to 5-fold being preferred. During biaxial stretching, a surface area ratio of from 1.5 to 20-fold is desirable, with from 4 to 12-fold being preferred. As needed, a heat treatment may be applied at elevated temperature.

Drawing is conducted within a suitable known temperature range of greater than or equal to the glass transition temperature when an amorphous resin is employed and from greater than or equal to the glass transition temperature of the amorphous component and less than or equal to the crystal melting temperature of the crystalline portion when a crystalline resin is employed. Generally, stretching is desirably conducted at a temperature of from 2 to 60° C. lower than the melting point of the thermoplastic resin employed. When employing a thermoplastic resin in the form of a propylene homopolymer (with a melting point of from 155 to 167° C.), stretching is desirably conducted at from 152 to 164° C., when employing high-density polyethelene (with a melting point of from 121 to 134° C.), stretching is desirably conducted at 110 to 120° C., and when employing polyethylene terephthalate (with a melting point of from 246 to 252° C.), stretching is desirably conducted at from 104 to 115° C.

Further, a stretching rate of from 20 to 350 m/min is desirable.

The order of lamination and stretching of the individual layers comprising the forgery-preventing film of the present invention is not specifically limited. For example, first layer (A) and second layer (B) may be separately stretched and then laminated, or first layer (A) and second layer (B) may be laminated and then collectively stretched. When third layer (C) is present, the three layers may be separately stretched and then laminated, laminated first and then collectively stretched, or first layer (A) and third layer (C) may be laminated and stretched, after which stretched or unstretched second layer (B) may be laminated to manufacture the forgery-preventing film of the present invention. These methods may also be suitably combined.

The preferred manufacturing method is to first laminate multiple layers and then conduct stretching collectively. Greater convenience is afforded and the cost is lower than when each layer is separately stretched and then laminated.

When an inorganic finepowder and/or organic filler is contained in the layers, stretching causes fine cracking of the film surface, with fine voids being produced in the film. The porosity of the forgery-preventing film of the present invention following stretching is from 1 to 20 percent, preferably from 2 to 15 percent, when it is desirable to suppress opacity in a forgery-preventing film satisfying Condition 1. The same is true for forgery-preventing films satisfying Conditions 2, 3, and 4.

In a forgery-preventing film satisfying Condition 3, the porosity of second layer (B) is made greater than that of first layer (A). The use of such a configuration makes clear the presence of voids nonuniformly distributed within second layer (B) or produces white pattern in the second layer (B) that effectively prevent forgery. To effectively generate white pattern, it is desirable to keep the porosity (A/B) of first layer (A) to second layer (B) to less than or equal to $1/3$. In a forgery-preventing film of the present invention comprising third layer (C), the porosity of third layer (C) is desirably made greater than that of first layer (A), with the porosity (A/C) being kept to less than or equal to $1/3$.

In a forgery-preventing film satisfying Condition 5, the respective porositys of first layer (A), second layer (B), and third layer (C) are desirably from 0 to 40 percent, greater than 20 percent and less than or equal to 40 percent, and greater than 20 percent and less than or equal to 40 percent, with respective porositys of from 1 to 30 percent, 25 to 35 percent, and 25 to 35 percent being preferred. When each of these exceeds 40 percent, the forgery-preventing treatment becomes difficult to make out with transmitted light.

To improve the antistatic property and suitability to various forms of printing of the thermoplastic resin layer comprising the outermost layer of the forgery-preventing film of the present invention, a surface treatment is desirably conducted to modify the surface following molding of the laminate structure. An example of a surface treatment method is the combination of a surface oxidation treatment and treatment with a surface treatment agent.

The surface oxidation treatment may be conducted by the use, either singly or in combination, of generally employed corona discharge treatment, flame treatment, plasma treatment, glow discharge treatment, ozone treatment, or the like. Of these, the corona treatment and flame treatment are preferred. The corona treatment level is desirably from 600 to 12,000 J/m$^2$ (10 to 200 W·min/m$^2$), with from 1,200 to 9,000 J/m$^2$ (20 to 150 W·min/m$^2$) being preferred. The flame treatment is desirably conducted at from 8,000 to 200,000 J/m$^2$, with from 20,000 to 100,000 J/m$^2$ being preferred.

The surface treatment agent may be selected chiefly from among the following primers and antistatic polymers, and may thus be a single compound or a mixture of two or more components. From the perspective of preventing static and improving adhesion in a dry laminate, the preferred surface treatment agent is a primer or a combination of primer and antistatic polymer.

Examples of primers constituting surface treatment agents suitable for use are: polyethyleneimine, polyethyleneimines modified with alkyls having from 1 to 12 carbon atoms, ethyleneimine adducts of poly(ethyleneimine-urea) and polyaminepolyamide and epichlorhydrin adducts of polyamine polyamides, and other polyethyleneimine polymers; acrylic acid amide-acrylic acid ester copolymers; acrylic acid amide—acrylic acid ester—methacrylic acid ester copolymers, polyacrylamide derivatives, oxazoline group-comprising acrylic acid ester polymers, polyacrylic acid esters, and other acrylic acid ester polymers; polyvinyl pyrrolidone, polyethylene glycol, polyvinyl alcohol, and other water-soluble resins; and polyvinyl acetate, polyurethane, ethylene—vinyl acetate copolymers, polyvinylidene chloride, polypropylene chloride, acrylonitrile—butadiene copolymers, and other water-dispersible resins.

Of these, the compounds of preference are the polyethyleneimine polymers, urethane resins, and polyacrylic acid esters. The compounds of greater preference are the polyethyleneimine polymers. And the compounds of even greater preference are polyethyleneimines having a degree of polymerization of from 20 to 3,000, the ethyleneimine adducts of polyamine polyimides, and modified polyethyleneimines obtained by modifying these compounds with alkyl halides having from 1 to 24 carbon atoms, alkenyl halides having from 1 to 24 carbon atoms, cycloalkyl halides having from 1 to 24 carbon atoms, and halogenated benzyl groups having from 1 to 24 carbon atoms.

Examples of antistatic polymers comprising surface treatment agents are cationic polymers, anionic polymers, and amphoteric polymers. Examples of cationic polymers are polymers having quaternary ammonium salt or phosphonium salt structures, nitrogenous acrylic polymers, and nitrogenous acrylic or methacrylic polymers having a quaternary ammonium salt structure. Examples of amphoteric polymers are nitrogenous acrylic or methacrylic polymers having a betaine structure. Examples of cationic polymers are styrene—maleic anhydride copolymers and their alkali metal salts, alkali metal salts of ethylene—acrylic acid copolymers, and alkali metal salts of ethylene—methacrylic acid copolymers. Of particular preference are nitrogenous acrylic or methacrylic polymers having a quaternary ammonium salt structure.

The molecular weight of the antistatic polymer may be adjusted as desired based on the polymerization temperature, the type and quantity of polymerization initiator employed, the quantity of solvent employed, the chain-transfer agent employed, and other polymerization conditions. The molecular weight of the polymer obtained is generally from about 1,000 to 1,000,000, with a range of from 1,000 to 500,000 being preferred.

The surface treatment agent employed in the present invention may comprise as needed a crosslinking agent, alkali metal salt, alkaline earth metal salt, or the like.

The addition of a crosslinking agent to the surface treatment agent further improves coating strength and water resistance. Examples of crosslinking agents are glycidyl ether, glycidyl ester, and other epoxy compounds; epoxy resin; and isocyanate-based, oxazoline-based, formalin-based, and hydrazide-based water-dispersible resins. The quantity of crosslinking agent added normally falls within a range of less than or equal to 100 weight parts per 100 weight parts of the active components, excluding solvent, of the surface-modifying agent.

Examples of the alkali metal salts and alkaline earth metal salts employed in the surface treatment agent are water-soluble inorganic salts such as sodium carbonate, sodium bicarbonate, potassium carbonate, sodium sulfite, and other alkali salts; and sodium chloride, sodium sulfate, sodium nitrate, sodium tripolyphosphate, sodium pyrophosphate, ammonium alum, and the like. The quantity added is normally less than or equal to 50 weight parts per 100 weight parts of the active components, excluding solvent, of the surface-modifying agent.

Surfactants, antifoaming agents, water-soluble and water-dispersible finepowder substances, and other adjuvants may be added to the surface-modifying agent. The quantity of these components is normally less than or equal to 20 weight parts per 100 weight parts of the active components, excluding solvent, of the surface-modifying agent.

The individual components of these surface treatment agents may be dissolved for use in water or a hydrophilic solvent such as methyl alcohol, ethyl alcohol, or isopropyl alcohol. Of these, use in the form of an aqueous solution is conventional. The concentration of the aqueous solution is normally from 0.1 to 20 weight percent, desirably from about 0.1 to 10 weight percent.

Coating may be conducted by roll coater, blade coater, bar coater, air-knife coater, size press coater, gravure coater, reverse coater, die coater, lip coater, spray coater, or the like. As required, smoothing may be conducted and a drying step may be employed to remove excess water or hydrophilic solvent.

The coating amount is 0.005 to 5 g/m$^2$, desirably 0.01 to 2 g/m$^2$, based on dry components.

The surface treatment may be conducted either before or after longitudinal or traverse stretching. The surface treatment agent may be applied in a single application or in a multistage application.

Following the surface treatment, as needed, a writability-imparting layer, print quality-enhancing layer, heat transfer receiving layer, heat-sensitive recording layer, ink-jet receiving layer, or the like may be applied by the same method as used to apply the surface treatment agent.

When layers are formed on or over the surface of second layer (B) or third layer (C) in the forgery-preventing film of the present invention obtained as set forth above, a recording layer may be provided on the surface of the outermost layer. This recording layer may be printed by electrophotography, sublimation heat transfer, hot melt heat transfer, direct thermal, rewritable marking, ink-jet printer, letterpress printing, gravure printing, flexo printing, solvent offset printing, ultraviolet-setting offset printing, or a rotary method based on the form of the film or a roller.

One or a combination of two or more of the above-described forgery-preventing treatments may be applied to the forgery-preventing film of the present invention. When one such treatment is applied, a good forgery-preventing effect is achieved relatively inexpensively. When two or more are combined, a better forgery-preventing effect is achieved.

Application of the Forgery-Preventing Film of the Present Invention

The physical properties of the forgery-preventing film of the present invention can be suitably adjusted based on the purpose and environment of use.

In films satisfying Condition 1, where it is desirable to keep the opacity low, the opacity (JIS P8138) of the forgery-preventing film of the present invention is desirably from 1 to 60 percent, preferably from 5 to 55 percent, and more preferably from 15 to 50 percent. When the opacity exceeds 60 percent, the printing and white pattern produced by embossing of first layer (A) become unclear, tending to compromise the ability to prevent forgery. In forgery-preventing films satisfying Condition 2, the same range of opacity is desirable. When the opacity exceeds 60 percent, the streaks formed in second layer (B) and third layer (C) become unclear, tending to compromise the ability to prevent forgery. In forgery-preventing films satisfying Condition 3, the opacity is desirably from 10 to 60 percent, preferably from 15 to 55 percent, and more preferably from 20 to 50 percent. When the opacity exceeds 60 percent, the white pattern formed on second layer (B) and third layer (C) become unclear, tending to compromise the ability to prevent forgery. When opacity is less than 10 percent, the low number of voids and the unclear generation of white pattern in second layer (B) and third layer (C) tend to compromise the ability to prevent forgery. In forgery-preventing films satisfying Condition 4, the opacity is desirably from 1 to 99 percent, preferably from 5 to 97 percent, and more preferably from 15 to 95 percent. When the opacity exceeds 99 percent, the printing and fluorescent dyes applied to the polymer net are unclear, tending to compromise the ability to prevent forgery. In forgery-preventing films satisfying Condition 5, the opacity is desirably greater than 60 percent and less than or equal to 99 percent, preferably from 65 to 97 percent, and more preferably from 70 to 95 percent. When the opacity exceeds 99 percent, the printing and white pattern formed by embossing on first layer (A) become visible when viewed either by reflected light or transmitted light, tending to compromise the ability to prevent forgery. Further, at less than or equal to 60 percent, the printing and white pattern formed by embossing of first layer (A) become unclear when viewed with reflected light, tending to compromise the ability to prevent forgery.

Further, the whiteness (JIS L1015) of the forgery-preventing film of the present invention is desirably 60-100 percent, preferably 70 to 100 percent. When the whiteness is outside this range, images and characters printed on second layer (B), third layer (C), and the outermost layer become unclear and difficult to recognize, and the external appearance tends to become unappealing.

The thickness of the forgery-preventing film of the present invention is desirably 50 to 200 micrometers, preferably 60 to 150 micrometers, and more preferably 80 to 120 micrometers. At a thickness of less than 50 micrometers, strength is inadequate and durability deteriorates. When a thickness of 200 micrometers is exceeded, bank notes (paper money) become excessively stiff and tend to be difficult to handle.

The tear strength (JIS K7128) of the forgery-preventing film of the present invention satisfying Condition 5 is desirably greater than or equal to 20 gf as an average longitudinal and traverse value. When the tear strength is outside this range, for example, in bank notes employing the present invention, tearing tends to begin at notches and scratches produced by circulation, tending to cause problems in the feeding of paper in automatic vending machines and the like.

These physical properties can be adjusted by suitably combining known methods.

Since first layer (A) is treated to prevent forgery in the forgery-preventing film of the present invention, the advantage of being able to readily detect copies is afforded.

For example, when a real bill that has been produced with an embossed forgery-preventing film satisfying Condition 1, or a forgery-preventing film satisfying Condition 2 or 3, is copied with silver salt photographic paper, thermal transfer image receiving paper, an OHP sheet comprised of polyethylene terephthalate biaxially stretched film, or the like, when the pressing cover of the copier is made of aluminum, the semitransparent portions of the real bill are printed bluish black in the copy. Thus, the two are readily distinguished by a visual comparison of the semitransparent portions of the real bill and the copy. When the pressing cover of the copier is a white plastic plate, cloth, or white cardboard, the pattern and white stripes in the watermark portions of the real bill end up becoming the color of the paper on the copy and are lost, and become transparent and are lost on copied OHP film. Thus, a visual comparison of the watermark portions of the original bill and the copy reveals the presence or absence of the pattern and white stripes, permitting ready distinction of the two.

When a real bill that has been produced with a forgery-preventing film satisfying Condition 1 that has been printed to prevent forgery is copied, the contrast of the copied image of the printed portion of the real bill changes greatly. The image is no longer sharp, and density decreases. Thus, a visual comparison of the sharpness of the image of the real bill and the copy permits the ready distinction of the two.

To reliably achieve the forgery-preventing effect of the forgery-preventing film of the present invention, it is desirable to intentionally provide portions (watermarks) where the recording layer remains unprinted.

When a real bill that has been produced using a forgery-preventing film satisfying Condition 4 is copied, the grid pattern of the polymer net is not copied. Further, although printing on the polymer net is copied, the contrast and resolution of the copied image are quite different. Thus, the image becomes unclear and the density decreases. Further, in bills that have been processed to prevent forgery with fluorescent ink and fluorescent whitening agents, the fluorescent colors cannot be reproduced or copying is altogether precluded. Thus, the real item and the forgery can be readily distinguished. Further, when photochromic ink is employed as the above-described special ink, the printed pattern of the photochromic portion can be viewed when exposed to ultraviolet radiation in the form of a black light or the like although the printed pattern can not be viewed under white light. When a fluorescent pigment is employed as the special ink, the printed pattern of the fluorescent pigment can be viewed under white light and ultraviolet radiation.

Even when the fluorescent ink portion is copied without copying the photochromic portion, exposure to ultraviolet radiation in the form of a black light permits the distinction of real and forged items.

Forgery-preventing films satisfying Condition 5 are treated to prevent forgery so that the treatment of first layer (A)

cannot be seen with reflected light, but must be viewed with transmitted light. Thus, the forgery-preventing treatment cannot be copied. A further advantage is afforded in that even were such a treatment to be copied, the copying would be readily apparent.

The forgery-preventing film of the present invention can be broadly applied to any item the forging of which must be prevented. Examples are bank notes, bills, checks, traveler's checks, lottery tickets, product certificates, stock certificates, other securities, various cards, entry tickets, tickets, national identity cards, driver's licenses, resident cards, household registers, official stamp certificates, passports, visas, deposit certificates, and pledge certificates. When the forgery-preventing film of the present invention is employed to make paper money, the appearance of the original simple paper bill is maintained without any sense of incompatibility. Water-repellency and durability are good, and numerous applications are possible.

EXAMPLES

The characteristics of the present invention are specifically described below through examples. The materials, quantities employed, ratios, treatments, treatment sequences, and the like indicated in the examples below may be suitably modified while remaining within the spirit of the present invention. Accordingly, the scope of the present invention is not to be interpreted as being limited to these specific examples.

Example 1

Composition (A) was prepared by mixing 87 weight parts of propylene homopolymer with a melt flow rate (MFR) of 4 g/10 min, 3 weight parts of heavy calcium carbonate with an average particle diameter of 3 micrometers, 10 weight parts of high-density polyethylene with an MFR of 10 g/10 min, 0.05 weight part of 3-methyl-2,6-di-t-butylphenol per a total of 100 weight parts of the propylene homopolymer and the heavy calcium carbonate, 0.08 weight part of phenol stabilizer (made by Ciba-Geigy Co., product name Irganox 1010) per a total of 100 weight parts of the propylene homopolymer and the heavy calcium carbonate, and 0.05 weight part of phosphorus-based stabilizer (made by G. E. Plastics, product name Weston 618) per a total of 100 weight parts of the propylene homopolymer and the heavy calcium carbonate. Composition (A) was kneaded in an extruder set to 250° C., extruded to mirror-surface cast rolls through a T-die connected to an extruder set to 230° C. following extrusion, and while cooling the back surface with a cooling device, herringbone-embossed with an embossing roll 0.5 mm deep that had been heated to 100° C., to obtain an unstretched film. The film was heated to 160° C. and stretched 4.6-fold in the longitudinal direction with a longitudinal stretching device comprising a group of rolls of varying peripheral speeds.

Compositions (B) and (C) that were identical in blending composition to Composition (A) were melted and kneaded in an extruder set to 240° C. and extrusion laminated onto the both sides of the stretched film of Composition (A) that had been obtained as set forth above, to obtain a three-layer laminate (B/A/C).

The three-layer laminate obtained was heated to 160° C. in a tenter oven and stretched 9-fold in the traverse direction. It was then passed through a heat set zone (set to a temperature of 165° C.) connected to the tenter oven.

The both surfaces of the film were treated by corona discharge at an applied energy density of 90 W·min/m². A roll coater was then used to apply to the both surfaces an aqueous solution containing an equal-quantity mixture of butyl-modified polyethyleneimine, an ethyleneimine adduct of polyaminepolyamide, and an acrylic acid alkylester copolymer having a quaternary ammonium salt structure in a coating amount of about 0.1 g/m² per side after drying and the coating was dried. The thicknesses of the layers constituting the three-layer laminate film obtained (B/A/C) was 25/50/25 micrometers.

The forgery-preventing film obtained had a regular pattern of white stripes derived from embossing between layers (A) and (B) and between layers (A) and (C).

Example 2

Composition (A), identical to that in Example 1, was kneaded in an extruder set to 250° C. and extruded to mirror-surface cast rolls through a T-die connected to an extruder set to 230° C., and the back surface thereof was cooled by a cooling device to obtain an unstretched film. The film was heated to a temperature of 160° C., sprayed with water by a device positioned in proximity to the roll for longitudinal stretching, and longitudinally stretched 4.2-fold by rolls of differing peripheral speeds. Operations identical to those in Example 1 were then conducted to obtain a three-layer laminate film of 90 micrometers thick. The thickness of the layers constituting the three-layer laminate film obtained (B/A/C) was 20/50/20 micrometers. The forgery-preventing film obtained had irregular pattern of white stripes between layers (A) and (B) and between layers (A) and (C).

Example 3

Composition (A) identical to that in Example 1, ethylene-propylene copolymer (b) with an MFR of 4 g/10 min and a melting point of 137° C. (DSC peak temperature), and metallocene polyethylene (c) with an MFR of 4 g/10 min, a density of 0.91 g/cm³ and a melting point of 110° C. (DSC peak temperature) were coextruded through a T-die connected to an extruder set to 230° C. to obtain a (b)/(A)/(c) three-layer laminate. The laminate was heated to 155° C., longitudinally stretched 4.6-fold with a longitudinal stretching device comprised of a group of rolls of differing peripheral speeds, and wound onto a roll. A uniaxially stretched film (D) with a thickness of 50 micrometers and an opacity of 20 percent was thus obtained. An image reduced to $\frac{1}{5}^{th}$ original size in a direction perpendicular to the stretching direction was printed with an on-site color printer CB-418-T1 made by TEC on the (b) side of rolled film (D).

Separately, Composition (A) identical to that in Example 1 was kneaded in an extractor set to 250° C., extruded to mirror-surface cast rolls through a T-die connected to an extruder set to 230° C., and the back surface was cooled with a cooling device to obtain an un stretched film. The film was heated to 155° C. and longitudinally stretched 4.6-fold with a longitudinal stretching device comprised of a group of rolls of differing peripheral speeds to obtain a longitudinally stretched film of Composition (A).

The longitudinally stretched film of Composition (A) was stacked on, and in contact with, the (c) side of uniaxially stretched film (D) obtained as set forth above (uniaxially stretched film (D) was fed from the roll) to obtain a two-layer laminate (D/A). Compositions (B) and (C) of the same composition as in Example 1 were extruded with an extruder set to 240° C. onto either side of laminate (D/A) to obtain a four-layer laminate (B/D/A/C).

The four-layer laminate thus obtained was heated in a tenter oven to 160° C. and stretched 9-fold in the traverse direction. It was then passed through a heat set zone (set to a temperature of 165° C.) connected to the tenter oven to obtain a four-layer laminate film of 110 micrometers thick. The thickness of the layers constituting the four-layer laminate film (B/D/A/C) was 25/5/55/25 micrometers. The film obtained had a forgery-preventing layer (D) between layers (A) and (B).

Test Example 1

The porosity, opacity, and whiteness of each of the forgery-preventing films obtained in Examples 1-3 were measured. The porosity was calculated from Equation (1) below:

$$\text{Porosity}(\%)=((\rho_0-\rho)/\rho_0)\times 100 \tag{Equ. 1}$$

$\rho_0$ in Equation 1 denotes the true density of the stretched film and $\rho$ denotes the density (JIS P-8118) of the stretched film. So long as the material did not contain a large amount of air prior to stretching, the true density was nearly equal to the density before stretching.

Further, patterns were printed on both sides of each of the forgery-preventing films with offset printing inks POP·K black, POP·K indigo blue, POP·K red, and POP·K yellow made by Dainippon Ink Kagaku Kogyo (K.K.). Unprinted portions in the form of 20 mm circles were left so that watermarks remained.

The above-described printed forgery-preventing films were employed as originals and color copies were made with a color copier (Docu Color 1250, made by Fuji Xerox Co.). Pulp paper and OHP film comprised of biaxially-stretched polyethylene terephthalate were employed as the copy medium. An evaluation was conducted to determine whether the pattern of white stripes of the watermarks was copied based on the following scale.

[Evaluation Scale for Films of Examples 1 and 2]
O: The irregular pattern of white stripes of watermarks was not copied. The watermarks remained white when pulp paper was employed as the copy medium, and the watermarks became transparent when OHP film was employed.
X: The irregular pattern of white stripes of the watermarks was copied.

[Evaluation Scale for Film of Example 3]
O: The internal printed areas of the watermarks became unclear, differing from the original.
X: The internal printed areas of the watermarks were sharp, and could not be distinguished from the original.

Further, an attempt was made to use the above-described forgery-preventing film as a copy medium and make a copy of the original with a color copier. As a result, the heat of the transfer roll made it difficult for the forgery-preventing film to pass (feeding was impossible), precluding color copies.

The results are given in Table 1:

the ready distinction of the forgery from the true item. The forgery-preventing film of the present invention tends not to develop wrinkles and is well suited to printing and watermarks. Thus, it can be suitably employed in paper money, securities, confidential documents, and the like.

Example 4

Forgery-preventing films were obtained by the same method as in Example 1 with the exception that a composition was prepared by blending 60 weight parts of propylene homopolymer with an MFR of 4 g/10 min, 40 weight parts of heavy calcium carbonate with an average particle size of 3 micrometers, 3 weight parts of high-density polyethylene with an MFR of 10 g/10 min, and 0.7 weight parts of titanium dioxide with an average particle diameter of 0.2 micrometer, 0.05 weight part of 3-methyl-2,6-di-t-butylphenol per a total of 100 weight parts of propylene homopolymer and heavy calcium carbonate, 0.08 weight part of phenolic stabilizer (product name Irganox 1010, made by Ciba-Geigy Co.) per a total of 100 weight parts of propylene homopolymer and heavy calcium carbonate, and 0.05 weight part of phosphorus-based stabilizer (product name Weston 618, made by G. E. Plastics) per a total of 100 weight parts of propylene homopolymer and heavy calcium carbonate, and the obtained composition was employed as Compositions (B) and (C).

The forgery-preventing films obtained had white stripes in regular patterns derived from embossing between layers (A) and (B), and between layers (A) and (C).

Example 5

With the exception that the composition described in Example 4 was employed as Compositions (B) and (C), forgery-preventing films were obtained by the same method as in Example 2. The forgery-preventing films obtained had irregular pattern of white stripes between layers (A) and (B) and between layers (A) and (C).

Example 6

With the exception that the composition described in Example 4 was employed as Compositions (B) and (C), forgery-preventing films were obtained by the same method as in Example 3. The forgery-preventing films obtained had a printed forgery preventing layer (D) between layers (A) and (B).

Test Example 2

The opacity, whiteness, and porosity of each layer were measured for each of the forgery-preventing films of

TABLE 1

| | Thickness (micrometers) | Porosity (%) | Opacity (%) | Whiteness (%) | Copy medium | | |
|---|---|---|---|---|---|---|---|
| | | | | | Pulp paper | OHP | forgery-preventing film |
| Example 1 | 100 | 2 | 21 | 90 | O | O | not feedable |
| Example 2 | 90 | 4 | 30 | 91 | O | O | not feedable |
| Example 3 | 110 | 5 | 35 | 93 | O | O | not feedable |

As will be understood from Table 1, when the forgery-preventing film of the present invention is copied, changes in the contrast and brightness of the identification pattern permit Examples 4-6. The porosity was obtained from a ratio of voids area determined by an image analyzer (Model Luzex IID, made by Nireko (K.K.)) that can analyze the voids observed in a photograph taken by electron microscopy. Each of the forgery-preventing films was evaluated under fluorescent light on the following scale:
O: Forgery-preventing layer invisible in reflected light, visible in transmitted light.
X: Forgery-preventing layer visible in both reflected and transmitted light.
XX: Forgery-preventing layer invisible in both reflected and transmitted light.

The results are given in Table 2.

TABLE 2

| | Thickness (micrometers) | Opacity (%) | Whiteness (%) | Porosity (%) | | | Evaluation result |
|---|---|---|---|---|---|---|---|
| | | | | A | B | C | |
| Example 4 | 100 | 83 | 90 | 4 | 30 | 31 | O |
| Example 5 | 90 | 75 | 87 | 4 | 23 | 23 | O |
| Example 6 | 110 | 87 | 93 | 7 | 37 | 37 | O |

In the forgery-preventing film of the present invention, the identification pattern cannot be seen in reflected light. However, since the brightness or contrast of the identification pattern changes in transmitted light, a forgery and the real item are readily distinguished. Further, the forgery-preventing film of the present invention tends not to develop wrinkles and is well suited to printing and watermarks. Thus, it can be suitably employed in paper money, securities, confidential documents, and the like.

Example 7

Composition (A) was prepared by blending 87 weight parts of propylene homopolymer with an MFR of 4 g/10 min, 3 weight parts of heavy calcium carbonate with an average particle diameter of 3 micrometers, 10 weight parts of high-density polyethylene with an MFR of 10 g/10 min, 0.05 weight part of 3-methyl-2,6-di-t-butylphenol per a total of 100 weight parts of propylene homopolymer and heavy calcium carbonate, 0.08 weight part of phenolic stabilizer (product name Irganox 1010, made by Ciba-Geigy Co.) per a total of 100 weight parts of propylene homopolymer and heavy calcium carbonate, and 0.05 weight part of phosphorus-based stabilizer (product name Weston 618, made by G. E. Plastics) per a total of 100 weight parts of propylene homopolymer and heavy calcium carbonate. Composition A was extruded and kneaded at 250° C., and extruded through a T-die connected to an extruder set to 230° C. to obtain an unstretched film. This film was heated to 155° C. and longitudinally stretched 4.6-fold in a longitudinal stretching device comprised of a group of rolls of differing peripheral speeds to obtain a stretched film.

In an extruder set to 240° C., 50 weight parts of propylene homopolymer (B1) with a melt viscosity of 200 Pa·s and 50 weight parts of metallocene polyethylene (B2) with a melt viscosity of 100 Pa·s were melted and kneaded. This Composition (B), which had a difference in melt viscosity of 100 Pa·s, was extruded onto both surfaces of the stretched film of Composition (A), to obtain a three-layer laminate (B/A/B). The melt viscosities of the thermoplastic resins were measured at 230° C. at a shear rate of 1220 s$^{-1}$ with a Capillograph 1C (9.55 mm cylinder diameter, L/D=10) made by Toyo Seiki (K.K.).

The three-layer laminate obtained was heated to 160° C. in a tenter oven and then stretched 9-fold in the traverse direction. It was then passed through a hot set zone (set to 165° C.) connected to the tenter over.

Both sides of the film were corona discharge treated at an applied energy density of 90 W·min/m². A roll coater was then used to apply to the both surfaces an aqueous solution containing an equal-quantity mixture of butyl-modified polyethyleneimine, an ethyleneimine adduct of polyaminepolyamide, and an acrylic acid alkylester copolymer having a quaternary ammonium salt structure to a coating amount of about 0.1 g/m² per side after drying and the coating was dried. The thicknesses of the layers constituting the three-layer laminate film obtained (B/A/B) were 20/50/20 micrometers.

The forgery-preventing film obtained had a transparent streak pattern in the run direction for use in preventing forgery.

Example 8

In an extruder set to 240° C., 50 weight parts of propylene homopolymer (B1) with a melt viscosity of 200 Pa·s under a shear rate of 1220 S$^{-1}$ at 230° C. and 50 weight parts of 230° C. styrene graft polyethylene (B2) with a melt viscosity of 100 Pa·s under a shear rate of 1220 S$^{-1}$ at 230° C. were melted and kneaded. This Composition (B), which had a difference in melt viscosity of 100 Pa·s, was extruded by an extruder and laminated onto both surfaces of a stretched film of Composition (A) obtained in the same manner as in Example 7, to obtain a three-layer laminate (B/A/B). The same operations as in Example 7 were then conducted to obtain a three-layer laminate film. The thicknesses of the layers (B/A/B) were 23/50/23 micrometers.

The forgery-preventing film obtained had a streak pattern in the run direction for use in preventing forgery.

Test Example 3

Porosity defined by Equation (1), opacity, and whiteness of the forgery-preventing films obtained in Examples 7 and 8 were measured.

Further, patterns were printed by the same method as in Test Example 1 on the various forgery-preventing films, and copying was attempted onto pulp paper and OHP film. Evaluation was conducted according to the same scale as employed for the film of Examples 1 and 2.

An attempt was also made to employ the above-described films for forgery prevention as a copy medium and make a copy of an original with a color copier. As a result, the heat of the transfer roll made it difficult for the forgery-preventing film to pass (feeding was impossible), precluding color copies.

The results are given in Table 3:

TABLE 3

| | Thickness (micrometers) | Porosity (%) | Opacity (%) | Whiteness (%) | Copy medium | | forgery-preventing film |
|---|---|---|---|---|---|---|---|
| | | | | | Pulp paper | OHP | |
| Example 7 | 90 | 4 | 25 | 90 | O | O | not feeddable |
| Example 8 | 96 | 5 | 45 | 91 | O | O | not feeddable |

As will be understood from Table 3, when the forgery-preventing film of the present invention is copied, change in the brightness of the identification pattern permits the ready distinction of the forgery from the true item. The forgery-preventing film of the present invention tends not to develop wrinkles and is well suited to printing and watermarks. Thus, it can be suitably employed in paper money, securities, confidential documents, and the like.

Example 9

Composition (A) was prepared by blending 87 weight parts of propylene homopolymer with an MFR of 4 g/10 min, 3 weight parts of heavy calcium carbonate with an average particle diameter of 3 micrometers, 10 weight parts of high-density polyethylene with an MFR of 10 g/10 min, 0.05 weight part of 3-methyl-2,6-di-t-butylphenol per a total of 100 weight parts of propylene homopolymer and heavy calcium carbonate, 0.08 weight part of phenolic stabilizer (product name Irganox 1010, made by Ciba-Geigy Co.) per a total of 100 weight parts of propylene homopolymer and heavy calcium carbonate and 0.05 weight part of phosphorus-based stabilizer (product name Weston 618, made by G. E. Plastics) per a total of 100 weight parts of propylene homopolymer and heavy calcium carbonate.

Next, Composition (B) was prepared by blending 65 weight parts of propylene homopolymer with an MFR of 4 g/10 min, 30 weight parts of heavy calcium carbonate with an average particle diameter of 10 micrometers, 5 weight parts of high-density polyethylene with an MFR of 10 g/10 min, 0.05 weight part of 3-methyl-2,6-di-t-butylphenol per a total of 100 weight parts of propylene homopolymer and heavy calcium carbonate, 0.08 weight part of phenolic stabilizer (product name Irganox 1010, made by Ciba-Geigy Co.) per a total of 100 weight parts of propylene homopolymer and heavy calcium carbonate and 0.05 weight part of phosphorus-based stabilizer (product name Weston 618, made by G. E. Plastics) per a total of 100 weight parts of propylene homopolymer and heavy calcium carbonate.

Compositions (A) and (B) were extruded and kneaded at 250° C., and extruded through a T-die connected to an extruder set to 230° C. to obtain a three-layer laminate (B/A/B). This film was heated to 155° C. and longitudinally stretched 4.6-fold in a longitudinal stretching device comprised of a group of rolls of differing peripheral speeds to obtain a stretched film.

Additionally, Composition (D) of the same blend composition as Composition (A) was melted and kneaded in an extruder set to 240° C. and then extrusion laminated onto both sides of the three-layer laminate stretched film obtained above to obtain a five-layer laminate (D/B/A/B/D).

The five-layer laminate was heated to 160° C. in a tenter oven, stretched 9-fold in the traverse direction, and then passed through a heat set oven (set to a temperature of 165° C.) connected to the tenter oven.

The two surfaces of the film were treated by corona discharge at an applied energy density of 90 W·min/m². A roll coater was then used to apply to the both surfaces an aqueous solution containing an equal-quantity mixture of butyl-modified polyethyleneimine, an ethyleneimine adduct of polyaminepolyamide, and an acrylic acid alkylester copolymer having a quaternary ammonium salt structure to a coating amount of about 0.1 g/m² per side after drying and the coating was dried. The thicknesses of the layers constituting the five-layer laminate film obtained (D/B/A/B/D) was 24/2/48/2/24 micrometers.

The forgery-preventing film obtained had an irregular pattern of white stripes derived from voids in the (B) layers.

Example 10

In the same manner as in Example 9, Composition (A) was kneaded in an extruder set to 250° C. and extruded through a T-die connected to an extruder set to 230° C., and the back side was cooled with a cooling device to obtain an un stretched film. The film was heated to a temperature of 160° C. and longitudinally stretched 4.6-fold by rolls of differing peripheral speeds.

Above-described Composition (A) and Compositions (D) and (B) of the same blend compositions as in Example 9 were coextruded from an extruder set to 240° C. to laminate the stretched film of Composition (A) obtained as set forth above, to obtain a five-layer laminate (B/D/A/D/B). The same operations were then conducted as in Example 9 to obtain a five-layer laminate film. The thickness of the layers (B/D/A/D/B) was Feb. 20, 1950/20/2 micrometers.

The film obtained had irregular pattern of white stripes derived from voids in the B layers.

Test Example 4

The porosity, opacity, and whiteness of the various forgery-preventing films obtained in Examples 9 and 10 were measured. The porosity was obtained from a ratio of voids area determined by an image analyzer (Model Luzex IID, made by Nireko (K.K.)) that can analyze the voids observed in a photograph taken by electron microscopy. Further, a pattern was printed by the same method as in Text Example 1 on each of the forgery-preventing films obtained and attempts were made to make copies on pulp paper and OHP film. Evaluation was conducted on the same scale as for the films of Examples 1 and 2.

Further, an attempt was made to use the above-described forgery-preventing film as a copy medium and make a copy of the original with a color copier. As a result, the heat of the transfer roll made it difficult for the forgery-preventing film to pass (feeding was impossible), precluding color copies.

The results are given in Table 4.

TABLE 4

|  | Porosity (%) | | | | Opacity (%) | Whiteness (%) | Copy medium | | forgery-preventing film |
|---|---|---|---|---|---|---|---|---|---|
|  | All layers | Layer A | Layer B | Layer D | | | Pulp paper | OHP | |
| Example 9 | 6 | 9 | 40 | 1 | 35 | 90 | ◯ | ◯ | not feedable |
| Example 10 | 6 | 7 | 28 | 1 | 34 | 90 | ◯ | ◯ | not feedable |

As will be understood from Table 4, when the forgery-preventing film of the present invention is copied, change in the brightness of the identification pattern permits the ready distinction of the forgery from the true item. The forgery-preventing film of the present invention tends not to develop wrinkles and is well suited to printing and watermarks. Thus, it can be suitably employed in paper money, securities, confidential documents, and the like.

Example 11

Composition (A) was prepared by blending 87 weight parts of propylene homopolymer with an MFR of 4 g/10 min, 3 weight parts of heavy calcium carbonate with an average particle diameter of 3 micrometers, 10 weight parts of high-density polyethylene with an MFR of 10 g/10 min, 0.05 weight part of 3-methyl-2,6-di-t-butylphenol per a total of 100 weight parts of propylene homopolymer and heavy calcium carbonate, 0.08 weight part of phenolic stabilizer (product name Irganox 1010, made by Ciba-Geigy Co.) per a total of 100 weight parts of propylene homopolymer and heavy calcium carbonate and 0.05 weight part of phosphorus-based stabilizer (product name Weston 618, made by G. E. Plastics) per a total of 100 weight parts of propylene homopolymer and heavy calcium carbonate. Composition (A) was kneaded in an extruder set to 250° C., extruded to mirror-surface cast rolls through a T-die connected to an extruder set to 230° C., and the one side was cooled with a cooling device to obtain an un stretched film. The film was heated to 160° C. and longitudinally stretched 4.6-fold with a longitudinal stretching machine comprised of a group of rolls of differing peripheral speeds.

Next, a biaxially stretched polyester film of 12 micrometers thick (product name FE2000, made by Nimura Kagaku Kogyo (K.K.)) was corona treated on both sides and an acrylic emulsion was coated thereon using a bar coater in 1 g/m². The film was then gravure printed with characters in the size of 0.7 mm around using fluorescent pigment ink. The film was cut to a width of 1.0 mm with a microslitter, and the thermoplastic resin tape obtained was employed as a structural component (M) in the run direction of a polymer net.

Similarly, unstretched metallocene polyethylene film of 40 micrometers thick and containing 200 ppm of the fluorescent whitening agent East Brite OB-1 (made by Eastman Kodak) was cut to a width of 1.0 mm with a microslitter and the thermoplastic resin tape obtained was employed as a structural component (T) in the traverse direction of the polymer net.

The tapes were plain woven and heat fused with a hot press. The obtained cloth (D) had a warp and woof of 12 mesh and an opening ratio of about 28 percent.

Cloth (D) was placed on, and in contact with, the surface of the longitudinally stretched film of Composition (A) (Cloth (D) was fed from a roll on which it had been wound) to obtain a two-layer laminate (D/A). Compositions (B) and (C) identical in Composition to Composition (A) were melted and kneaded in an extruder set to 240° C. and extruded onto either side of this laminate (D/A) to obtain a four-layer laminate (B/D/A/C).

The four-layer laminate obtained was heated to 160° C. in a tenter oven and then stretched 9-fold in the traverse direction. It was then passed through a heat set zone (set to a temperature of 165° C.) connected to the tenter oven.

The two surfaces of the film were treated by corona discharge at an applied energy density of 90 W·min/m². A roll coater was then used to apply to the both surfaces an aqueous solution containing an equal-quantity mixture of butyl-modified polyethyleneimine, an ethyleneimine adduct of polyaminepolyamide, and an acrylic acid alkylester copolymer having a quaternary ammonium salt structure in a coating amount of about 0.1 g/m² per side after drying and the coating was dried. The thicknesses of the layers constituting the four-layer laminate film obtained (B/D/A/C) were 10/15/50/25 micrometers.

The forgery-preventing film obtained had a regular grid pattern derived from the polymer net between layers (A) and (B).

Example 12

Hot melt adhesive was applied with a bar coater to a thickness of about 10 micrometers to a polyimide film of 12.5 micrometers thick (product name: Apical 12.5H, made by Kanegafuchi Kagaku Kogyo (K.K.)). The film was then gravure printed with characters in the size of 0.7 mm around using fluorescent pigment ink. The film was cut to a width of 1.0 mm with a microslitter, and the thermoplastic resin tape obtained was employed as the structural component (M) in the run direction of a polymer net. The remainder of the process was conducted as in Example 11. The thickness of the layer constituting the four-layer laminate film obtained (B/D/A/C) of about 10/15/50/25 micrometers.

Example 13

Composition (A) was prepared by blending 75 weight parts of propylene homopolymer with an MFR of 4 g/10 min, 14.6 weight parts of heavy calcium carbonate with an average particle diameter of 3 micrometers, 0.4 weight parts of titanium dioxide with an average particle diameter of 0.21 micrometer, 10 weight parts of high-density polyethylene with an MFR of 10 g/10 min, 0.05 weight part of 3-methyl-2,6-di-t-butylphenol per a total of 100 weight parts of propylene homopolymer and heavy calcium carbonate, 0.08 weight part of phenolic stabilizer (product name Irganox 1010, made by Ciba-Geigy Co.) per a total of 100 weight parts of propylene homopolymer and heavy calcium carbonate and 0.05 weight part of phosphorus-based stabilizer (product name Weston 618, made by G. E. Plastics) per a total of 100 weight parts of propylene homopolymer and heavy calcium carbonate. Composition (A) was kneaded in an extruder set to 250° C., extruded to mirror-surface cast rolls through a T-die connected to an extruder set to 230° C., and the one side was cooled with a cooling device to obtain an un stretched film. The film was heated to 160° C. and longitudinally stretched 4.6-fold with a longitudinal stretching machine comprised of a group of rolls of differing peripheral speeds.

Next, a biaxially stretched polypropylene film of 25 micrometers thick (product name P2261, made by Toyo Hoseki (K.K.)) was corona treated on both sides and an acrylic emulsion was applied with a bar coater in 1 g/m². The film was then gravure printed with characters in the size of 0.7 mm around using fluorescent pigment ink. The film was cut to a width of 1.0 mm with a microslitter, and the thermoplastic resin tape obtained was employed as a structural component (M) in the run direction of a polymer net.

Similarly, unstretched polypropylene film of 40 micrometers thick that contains 200 ppm of the fluorescent whitening agent East Brite OB-1 (made by Eastman Kodak) was cut to a width of 1.0 mm with a microslitter and the thermoplastic resin tape obtained was employed as a structural component (T) in the traverse direction of the polymer net. The remainder of the process was conducted as in Example 11. The four-layer laminate film obtained had individual film thicknesses (B/D/A/C) of about 20/10/50/25 micrometers.

Test Example 5

The Equation (1) porosity, opacity, and JIS K7128 tear strength of the various forgery-preventing films obtained in Examples 11-13 were measured. The following tests were also conducted.

(1) Copying Test on a Color Copier

Color copies were made using a color copier (Docu Color 1250, made by Fuji-Xerox) with the various forgery-preventing films as the originals. Pulp paper and OHP film comprised of biaxially-stretched polyethylene terephthalate film were employed as the copy media. The grid pattern of the polymer net and whether or not the printing on the polymer net was copied were evaluated on the following scale.

Impossible: The grid pattern derived from the polymer net was not copied and the printing applied to the polymer net was printed but unclear.

Possible: Both the grid pattern derived from the polymer net and the printing on the polymer net were copied.

(2) Color Copier Paper Feeding Test

Copying was attempted with a color copier using the various forgery-preventing films as copy media and the paper feed property was evaluated on the following scale.

Impossible: Paper feeding was difficult due to heat from the toner fixing rolls (there was fusion to the roll and distortion), precluding color copying.

Possible: There was no difficulty in feeding paper and color copying was possible.

(3) The Possibility of Recognition with UV Light

The appearance when exposed to ultraviolet lamp UVGL-58 (made by Ultraviolet Co.) of each of the forgery-preventing films was evaluated by naked eye based on the following scale.

O: Structural components in the traverse direction of the polymer net that were invisible under white light glowed bluish white and were recognized.

X: No change was observed with UV exposure.

The results are given in Table 5.

The present disclosure relates to the subject matter contained in PCT Application PCT/JP01/08101 filed on Sep. 18, 2001, Japanese Patent Application No. 281933/2000 filed on Sep. 18, 2000, Japanese Patent Application No. 281934/2000 filed on Sep. 18, 2000, Japanese Patent Application No. 281935/2000 filed on Sep. 18, 2000, Japanese Patent Application No. 336161/2000 filed on Nov. 2, 2000 and Japanese Patent Application No. 336162/2000 filed on Nov. 2, 2000. These applications are expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A forgery-preventing film comprising:
on one side of a first layer (A) comprising a thermoplastic resin, a second layer (B) comprising a thermoplastic resin,
wherein said second layer (B) comprises at least two thermoplastic resins of different melt viscosities, whereby a transparent streak pattern is formed in said second layer (B) to prevent forgery.

2. The forgery-preventing film according to claim 1, wherein said first layer (A) is of a multilayer structure.

3. The forgery-preventing film according to claim 1, wherein the difference in the melt viscosity of said two thermoplastic resins of differing melt viscosity contained in said second layer (B) is greater than 50 Pa·s.

4. The forgery-preventing film according to claim 3, wherein said layer (B) comprises a thermoplastic resin having a melt viscosity of from 180 to 300 Pa·s and a thermoplastic resin having a melt viscosity of from 50 to 130 Pa·s.

TABLE 5

| | Thickness (micrometers) | Porosity (%) | Tear strength (gf) | Opacity (%) | Whiteness (%) | Copying by color copier | Paper feeding in color copier | Recognition under UV radiation |
| --- | --- | --- | --- | --- | --- | --- | --- | --- |
| Example 11 | 100 | 4 | 45 | 30 | 90 | Impossible | Impossible | O |
| Example 12 | 100 | 5 | 60 | 32 | 91 | Impossible | Impossible | O |
| Example 13 | 105 | 12 | 30 | 84 | 93 | Impossible | Impossible | O |

Since the pattern derived from the polymer net and the brightness and contrast of printed areas changed when the forgery-preventing film of the present invention was copied, the copy and the real item were readily distinguishable. Further, the forgery-preventing film of the present invention tends not to develop wrinkles, is suited to printing, and has substantial tear strength.

As described above, the forgery-preventing film of the present invention permits the ready distinction of copies from original items. Further, since the forgery-preventing film of the present invention tends not to develop wrinkles, is well suited to printing, and has substantial tear strength, it can be advantageously employed on paper money, securities, confidential documents, and the like.

5. The forgery-preventing film according to claim 4, wherein said layer (B) comprises a propylene homopolymer having a melt viscosity of from 180 to 300 Pa·s and an ethylene based resin having a melt viscosity of from 50 to 130 Pa·s.

6. The forgery-preventing film according to claim 5, wherein said ethylene based resin is a metallocene polyethylene.

7. The forgery-preventing film according to claim 4, wherein said layer (B) comprises a propylene homopolymer having a melt viscosity of from 180 to 300 Pa·s and a styrene graft polyolefin resin having a melt viscosity of from 50 to 130 Pa·s.

8. The forgery-preventing film according to claim 7, wherein said ethylene based resin is a styrene graft polyethylene.

9. The forgery-preventing film according to claim 1, wherein the difference in the melt viscosity of said two thermoplastic resins of differing melt viscosity contained in said second layer (B) is greater than 80 Pa·s.

10. The forgery-preventing film according to claim 9, wherein said layer (B) comprises a thermoplastic resin having a melt viscosity of from 200 to 280 Pa·s and a thermoplastic resin having a melt viscosity of from 60 to 120 Pa·s.

11. The forgery-preventing film according to claim 1, wherein said layer (B) is stretched.

12. The forgery-preventing film according to claim 1, wherein a third layer (C) comprising at least two thermoplastic resins of different melt viscosities is formed on the back side of said first layer (A).

13. The forgery-preventing film according to claim 12, wherein the difference in melt viscosity of said two thermoplastic resins of differing melt viscosity contained in said third layer (C) is greater than 50 Pa·s.

14. The forgery-preventing film according to claim 12, wherein the difference in melt viscosity of said two thermoplastic resins of differing melt viscosity contained in said third layer (C) is greater than 80 Pa·s.

15. The forgery-preventing film according to claim 12, wherein said layer (C) is stretched.

16. The forgery-preventing film according to claim 12, wherein said second layer (B) has the same composition as said third layer (C).

17. The forgery-preventing film according to claim 12, wherein said second layer (B) has the same thickness as said third layer (C).

18. The forgery-preventing film according to claim 14, wherein said second layer (B) has the same thickness as said third layer (C).

19. The forgery-preventing film according to claim 1, having an opacity of from 1 to 60 percent.

* * * * *